United States Patent
Coppini

(10) Patent No.: US 12,227,887 B2
(45) Date of Patent: Feb. 18, 2025

(54) METHOD AND SYSTEM FOR CREATING A NON-WOVEN FABRIC

(71) Applicant: Lorenzo Coppini, Casciana Terme Lari (IT)

(72) Inventor: Lorenzo Coppini, Casciana Terme Lari (IT)

( * ) Notice: Subject to any disclaimer, the term of this patent is extended or adjusted under 35 U.S.C. 154(b) by 323 days.

(21) Appl. No.: 17/638,715

(22) PCT Filed: Aug. 27, 2020

(86) PCT No.: PCT/IB2020/058011
§ 371 (c)(1),
(2) Date: Feb. 25, 2022

(87) PCT Pub. No.: WO2021/038488
PCT Pub. Date: Mar. 4, 2021

(65) Prior Publication Data
US 2022/0220648 A1 Jul. 14, 2022

(30) Foreign Application Priority Data
Aug. 28, 2019 (IT) .................. 102019000015180

(51) Int. Cl.
*B29C 70/22* (2006.01)
*B32B 5/02* (2006.01)
(Continued)

(52) U.S. Cl.
CPC ............. *D04H 3/04* (2013.01); *B29C 70/222* (2013.01); *B29C 70/224* (2013.01); *B32B 5/022* (2013.01);
(Continued)

(58) Field of Classification Search
CPC ..... B29C 70/22; B29C 70/222; B29C 70/224; B29C 70/228; B32B 5/022; B32B 5/028;
(Continued)

(56) References Cited

U.S. PATENT DOCUMENTS 3,041,230 A * 6/1962 Diehl ................. D04H 3/04
156/181
3,829,339 A * 8/1974 081974 ................. D04H 3/04
156/181

FOREIGN PATENT DOCUMENTS

DE  30 03 666 A1  8/1981
EP  2 963 171 A1  1/2016
(Continued)

*Primary Examiner* — Michael A Tolin
(74) *Attorney, Agent, or Firm* — Maschoff Brennan

(57) ABSTRACT

A method to generate a non-woven fabric includes prearranging at least one thread guide arranged to guide at least one textile thread, prearranging moving means for actuating the thread guide according to at least one degree of freedom, prearranging at least one rigid support and handling each thread guide by the moving means for arranging at least one first portion of each textile thread along at least one first trajectory $\gamma\_1$ on each rigid support. Each thread guide is handled by the moving means for arranging at least one second portion of each textile thread along at least one second trajectory $\gamma\_2$ on each rigid support. Each second trajectory $\gamma\_2$ overlaps with each first trajectory $\gamma\_1$ at least at one intersection point P_i, joining each second portion of each textile thread with each first portion of each textile thread at each intersection point P_i.

12 Claims, 10 Drawing Sheets

(51) Int. Cl.
| | |
|---|---|
| *B32B 5/12* | (2006.01) |
| *B32B 5/26* | (2006.01) |
| *B32B 37/12* | (2006.01) |
| *B32B 38/00* | (2006.01) |
| *B32B 38/18* | (2006.01) |
| *D04H 3/04* | (2012.01) |
| *D04H 3/12* | (2006.01) |

(52) U.S. Cl.
CPC ............... *B32B 5/028* (2013.01); *B32B 5/12* (2013.01); *B32B 5/26* (2013.01); *B32B 37/1292* (2013.01); *B32B 38/1825* (2013.01); *B32B 38/1875* (2013.01); *D04H 3/12* (2013.01); *B32B 2038/0072* (2013.01); *B32B 2305/38* (2013.01)

(58) Field of Classification Search
CPC .. B32B 5/12; B32B 5/26; B32B 5/265; B32B 5/266; B32B 7/12; B32B 7/14; B32B 37/0076; B32B 37/0084; B32B 37/1292; B32B 37/24; B32B 38/1808; B32B 38/1825; B32B 38/1875; B32B 2038/0072; B32B 2305/38; D04H 3/04; D04H 3/045; D04H 3/05; D04H 3/07; D04H 3/12; D04H 3/14
See application file for complete search history.

(56) References Cited

FOREIGN PATENT DOCUMENTS

| | | |
|---|---|---|
| FR | 2 163 411 A1 | 7/1973 |
| JP | 2000-199151 A | 7/2000 |
| JP | 2018-039218 A | 3/2018 |
| WO | 98/17852 A1 | 4/1998 |

* cited by examiner

METHOD AND SYSTEM FOR CREATING A NON-WOVEN FABRIC

FIELD OF THE INVENTION

The present invention relates to the manufacturing and packaging sector of clothing and textile accessories, including for furnishing, and other products partially or completely made with textile threads.

In particular, the invention relates to a method and a system for the creation of a non-woven fabric.

DESCRIPTION OF THE PRIOR ART

Currently for the manufacture of clothing, accessories and textile products for the home or industry many steps are faced starting from the creation of one or more fabrics obtained through the intertwining of textile yarns, in turn composed of fibres or filaments of length variable twisted together.

The fabric is commonly made in strips or tubulars of variable length and width depending on the production support. Subsequently, the fabric can be treated or finished to improve its qualities or technical skills. The strip of fabric is then cut to obtain parts of a specific shape that will be used, after being combined with other materials or pre-treated, to create an item of clothing once sewn together, or joined with various methods, according to a sequence precise. The garment in turn can be subsequently finished, treated or printed.

The process described above has some drawbacks.

First, each of these steps is commonly managed by separate entities that make a single part or step of the semi-finished product, resulting in the need for numerous machines.

Furthermore, textile production requires high quantities to compensate for the amount of work required for the production of a fabric, especially for the so-called "shuttle" fabrics, i.e. fabrics with orthogonal warp and weft.

A further negative aspect is that the quality of the product obtained is strictly dependent on the manual skills and abilities of the people who participate in the packaging of the garment, although part of the process can be automated.

Finally, the cutting process produces a certain waste of fabric due to the specific shapes of the parts that will make up the garment.

As an alternative to the traditional process, there are the processes of creating so-called non-woven fabrics (TNT), a heterogeneous case that includes, for example, fabrics obtained through needle-punch processes, gluing on plastic supports (such as plastic films—bonded), thermoforming and/or mechanical compression of staple fibres, usually synthetic combined with glue substances (other examples of 'non-woven' are staple n., melt-blown n., spun-bond n., etc)

This category of fabrics is rarely used for textiles that come into contact with humans, due to the low quality of the fibres used and poor resistance to stress. Therefore, these fabrics are mainly used in industry and not for the creation of clothing.

Recently, methods have been experimented for the creation of textile parts that exploit the electrostatic properties of some fibres which are subsequently joined with physical/chemical actions.

Also in this case, the garments have poor quality and resistance qualities.

SUMMARY OF THE INVENTION

It is therefore a feature of the present invention to provide a process to generate garments, and parts of them, which requires a lower number of machines and steps than the processes of the prior art.

It is also a feature of the present invention to provide such a process which can be automated even in the case of production of a low number of items.

It is a further feature of the present invention to provide such a process that considerably reduces fabric waste.

It is still a feature of the present invention to provide such a process that can be used both for industrial production and for home production.

These and other objects are achieved by a method to generate a non-woven fabric, according to claims from 1 to 10.

BRIEF DESCRIPTION OF THE DRAWINGS

Further characteristic and/or advantages of the present invention are more bright with the following description of an exemplary embodiment thereof, exemplifying but not limitative, with reference to the attached drawings in which.

DESCRIPTION OF A PREFERRED EXEMPLARY EMBODIMENT

Figure 1A:
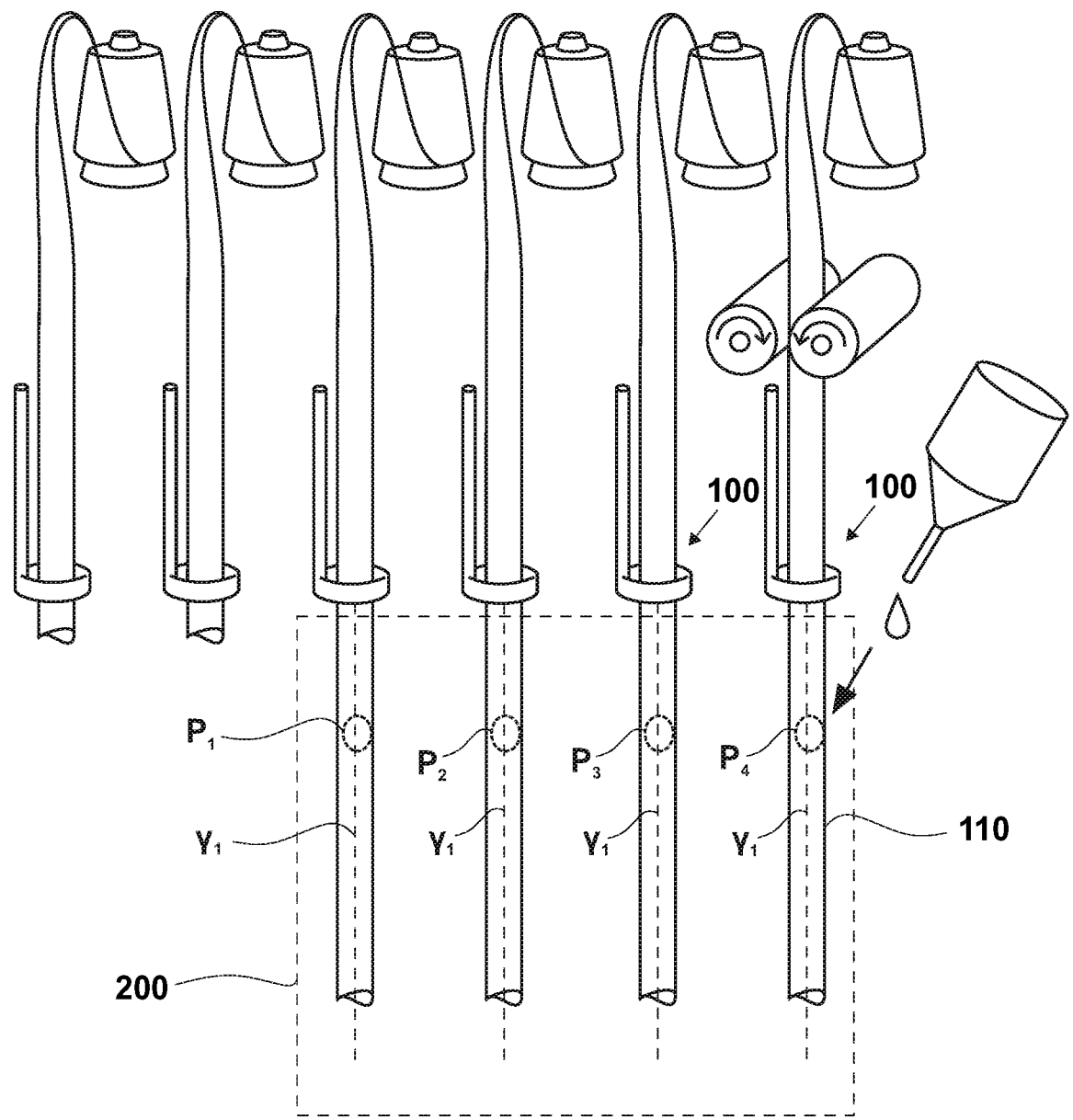
FIGS. 1A and 1B diagrammatically show the step of joining the textile threads of the method to generate a non-woven fabric, according to the present invention, showing the trajectories of the textile threads and the intersection point.
Figure 1B:
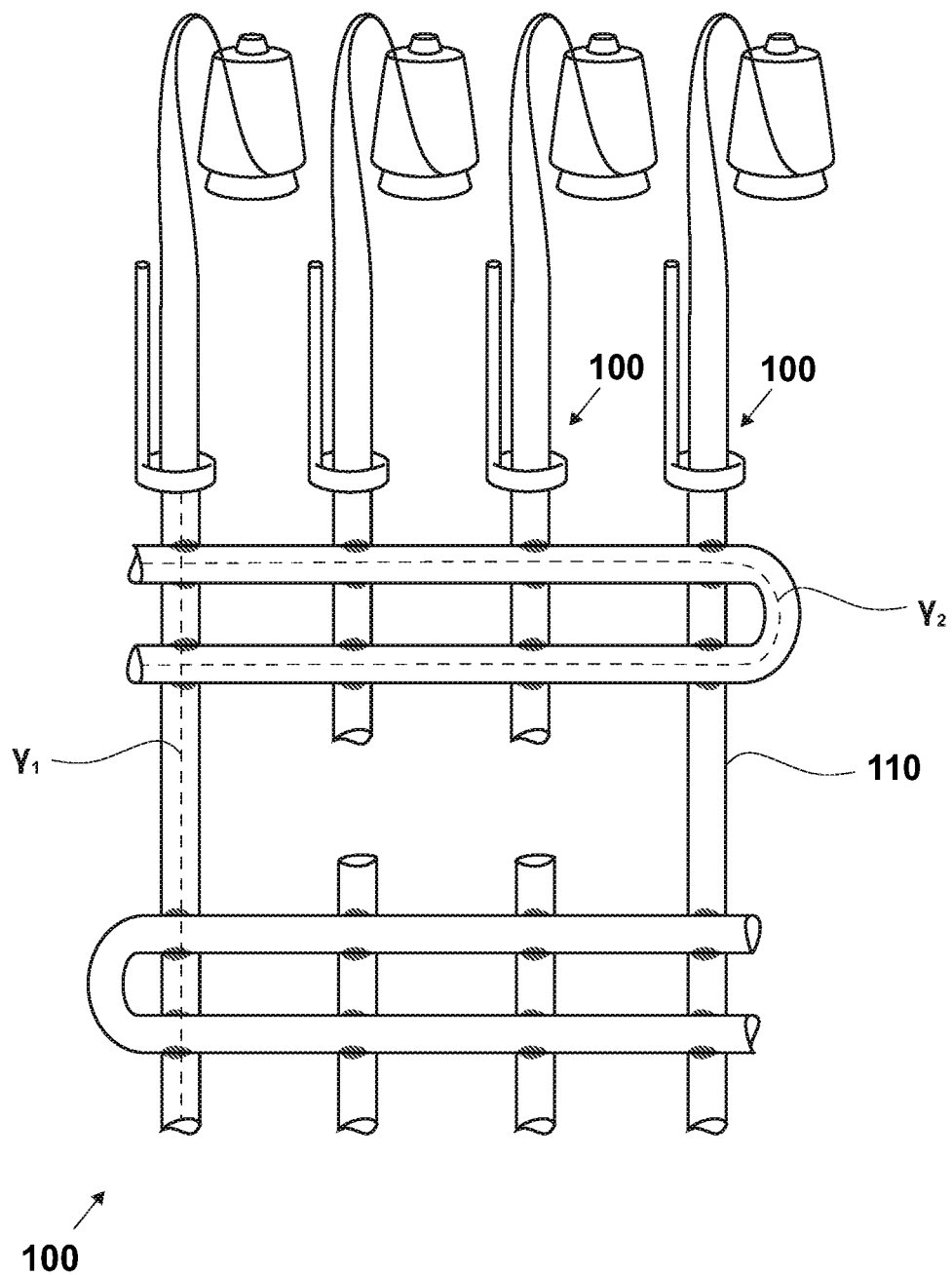

With reference to FIGS. 1A, 1B, 2 and 3 in a first embodiment of the method to generate a non-woven fabric 10, according to the present invention, there is a first step of prearranging a plurality thread guides 100 that are moved to guide at least as many textile threads 110 to arrange themselves along first trajectories $\gamma_1$ on a first rigid support 200, which in FIG. 1A is schematically represented by the dotted line below the thread guides 100. There is then a step of new handling of the thread guides 110 to arrange second portions of textile thread 110 along second trajectories $\gamma_2$, in order to join the first portions and the second portions of textile threads 110 at the intersection point $P_i$ and to thus create the non-woven fabric. The union of one thread on the other gives tension to the threads.

In particular, in the present embodiment of the method, the step of joining the textile threads is made by gluing and, before the joining step, there is a step of depositing a glue element on the intersection point $P_i$ on the portions of textile thread 110.

Figure 2:
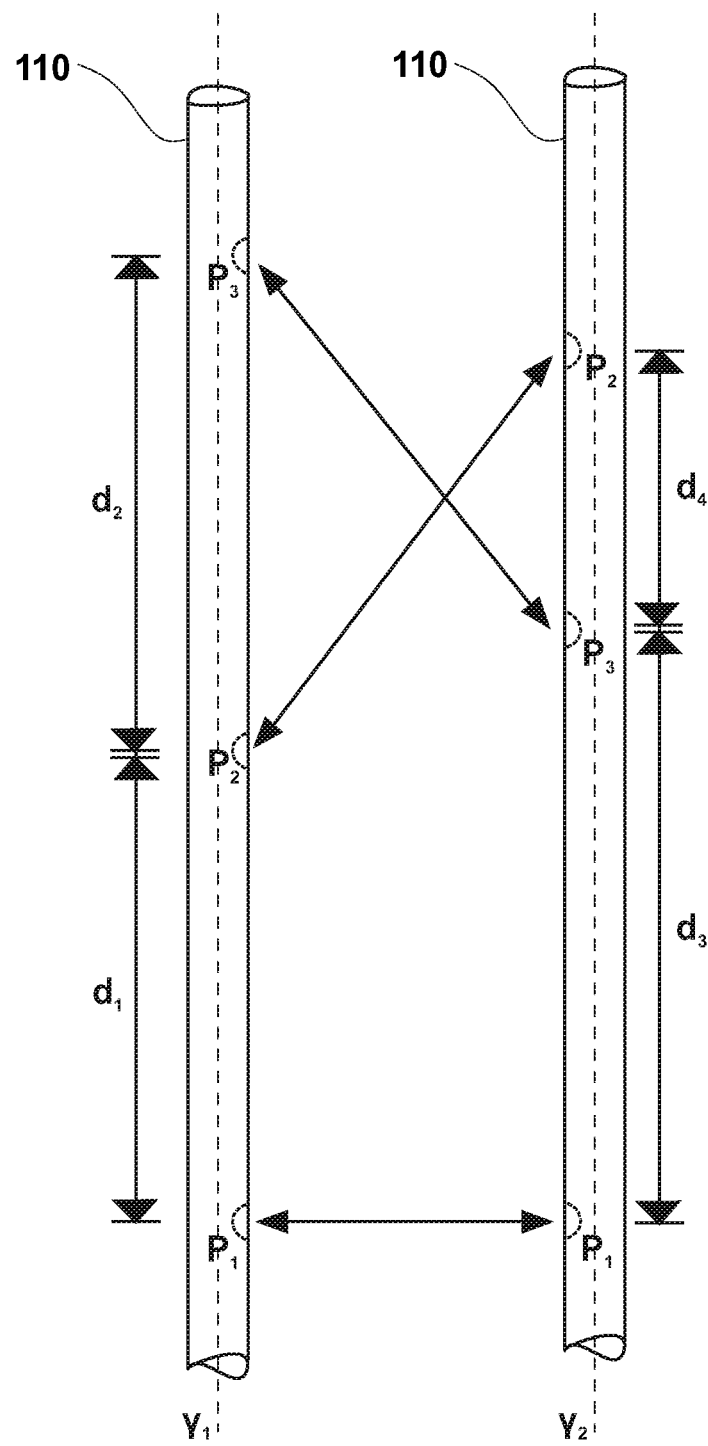
FIG. 2 shows two portions of textile threads suitable for being arranged on trajectories $\gamma_1$ and $\gamma_2$ at intersection point $P_i$ according to a defined sequence.

In particular, with reference to FIG. 2, the textile threads 110 can already be provided with glue before being arranged along the trajectories $\gamma_1$ and $\gamma_2$, calculating the distance $d_i$ between the intersection point $P_i$ on the respective threads 110.

In particular, the glue is arranged in such a way as to prevent it from escaping from the intersection point $P_i$, so as to prevent the non-woven fabric from becoming adhesive at the end of the process.

In particular, the glue element can be:
a photo-hardening resin, subsequently exposed to UV rays;
a two-component resin;
a physically or chemically activatable resin;
an adhesive film;
a combining the previous.

Alternatively, the textile threads can be treated previously, so that they can be joined by ultrasound.

Alternatively, the joining step can be made by means of other systems such as, for example, sewing or needling.

Figure 3:
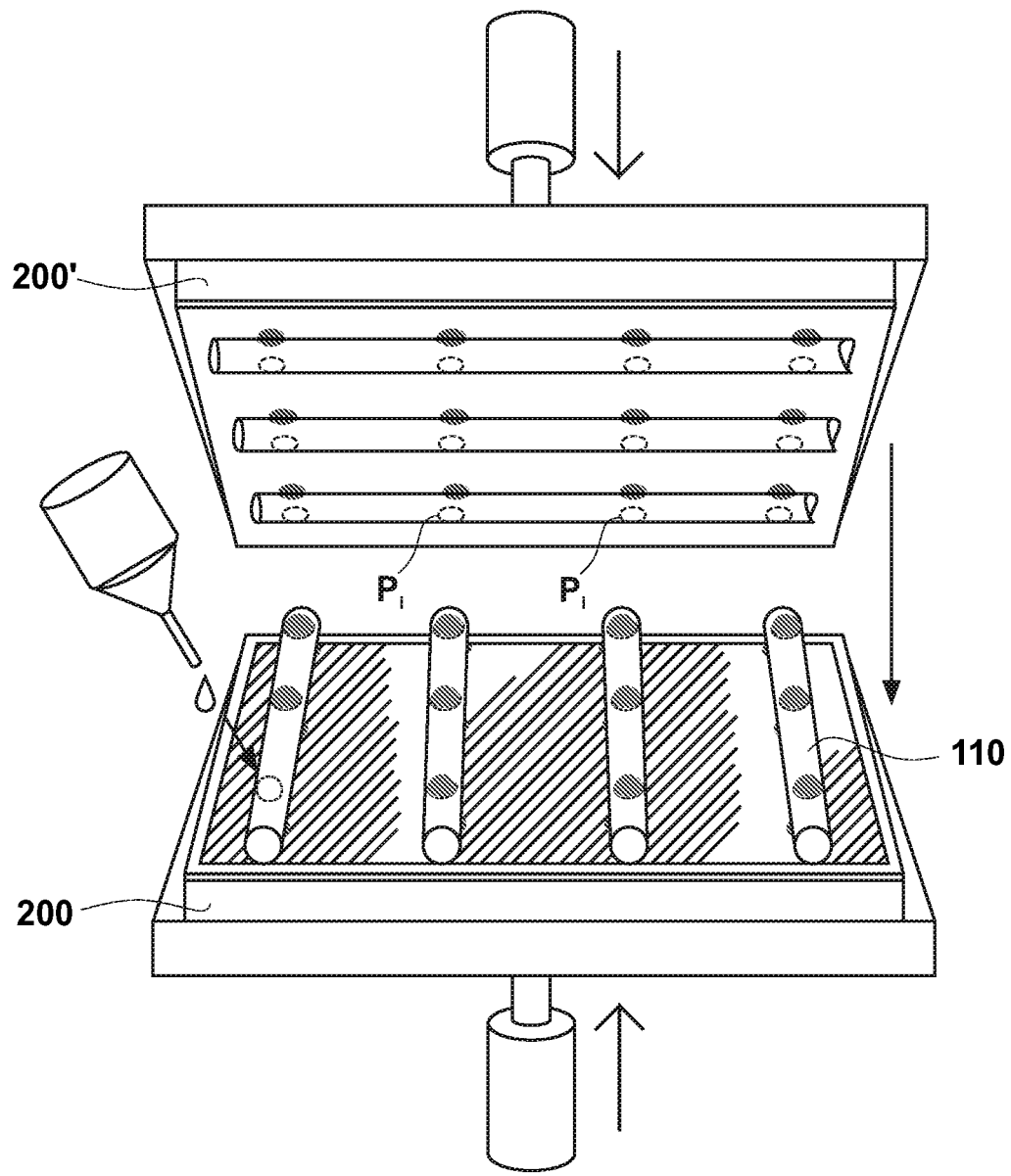
FIG. 3 shows graphically an exemplary implementation of the method wherein union is made by overlapping the two rigid supports.

With reference to FIG. 3, in an embodiment of the method, the second portions of textile threads 110 are arranged on a second rigid support 200' and the step of joining the textile threads 110 is made by overlapping the rigid supports 200 and 200'.

Figure 4:
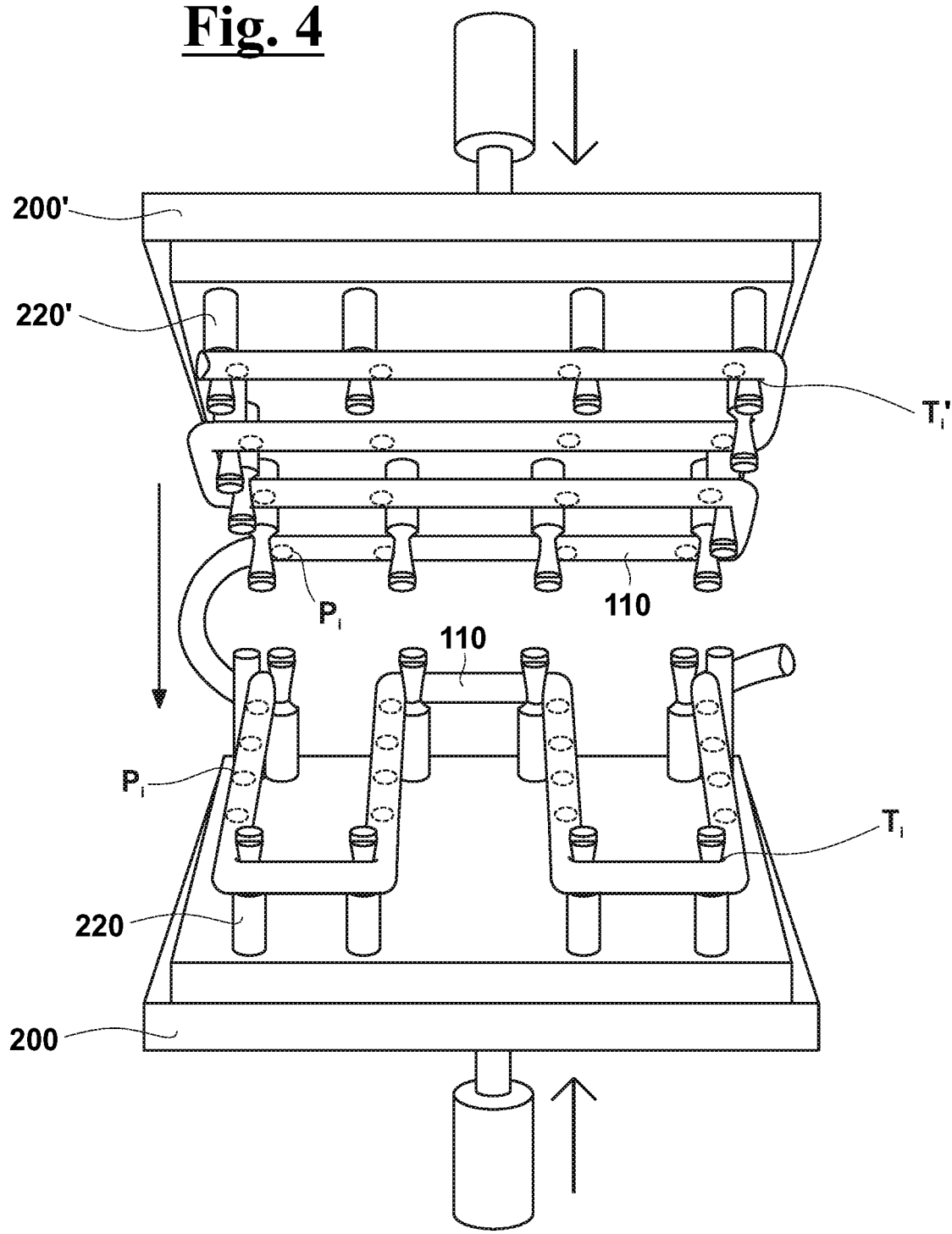
FIG. 4 shows graphically an exemplary implementation of the method where the tensioning points $T_i$ for arranging the portions of textile thread along the respective trajectories are made by means of tensioning elements integral to the rigid supports.

In the exemplary embodiment of FIG. 4, on the two rigid supports 200 and 200' tensioning elements 220,220' are provided arranged to create, respectively, tensioning points $T_i$ along the trajectories $\gamma_1$ and auxiliary tensioning points $T_i'$ along the trajectories $\gamma_2$ to provide to the textile threads 110 a predetermined tension between two consecutive tensioning points $T_i$. The rigid supports 200 and 200' are then overlapped, in a similar manner to what has been said for FIG. 3.

In particular, the tensioning elements 220,220' can be equipped with mobile parts, be totally or partially separable from the support or can be made, even partially, of elastic or soft materials (e.g. foam or rubber) to facilitate the overlapping and joining steps.

In this embodiment, both the first rigid support 200 and the second rigid support 200' have a planar shape. Alternatively, only one of the two rigid supports 200,200' may have planar shape.

Figure 5:
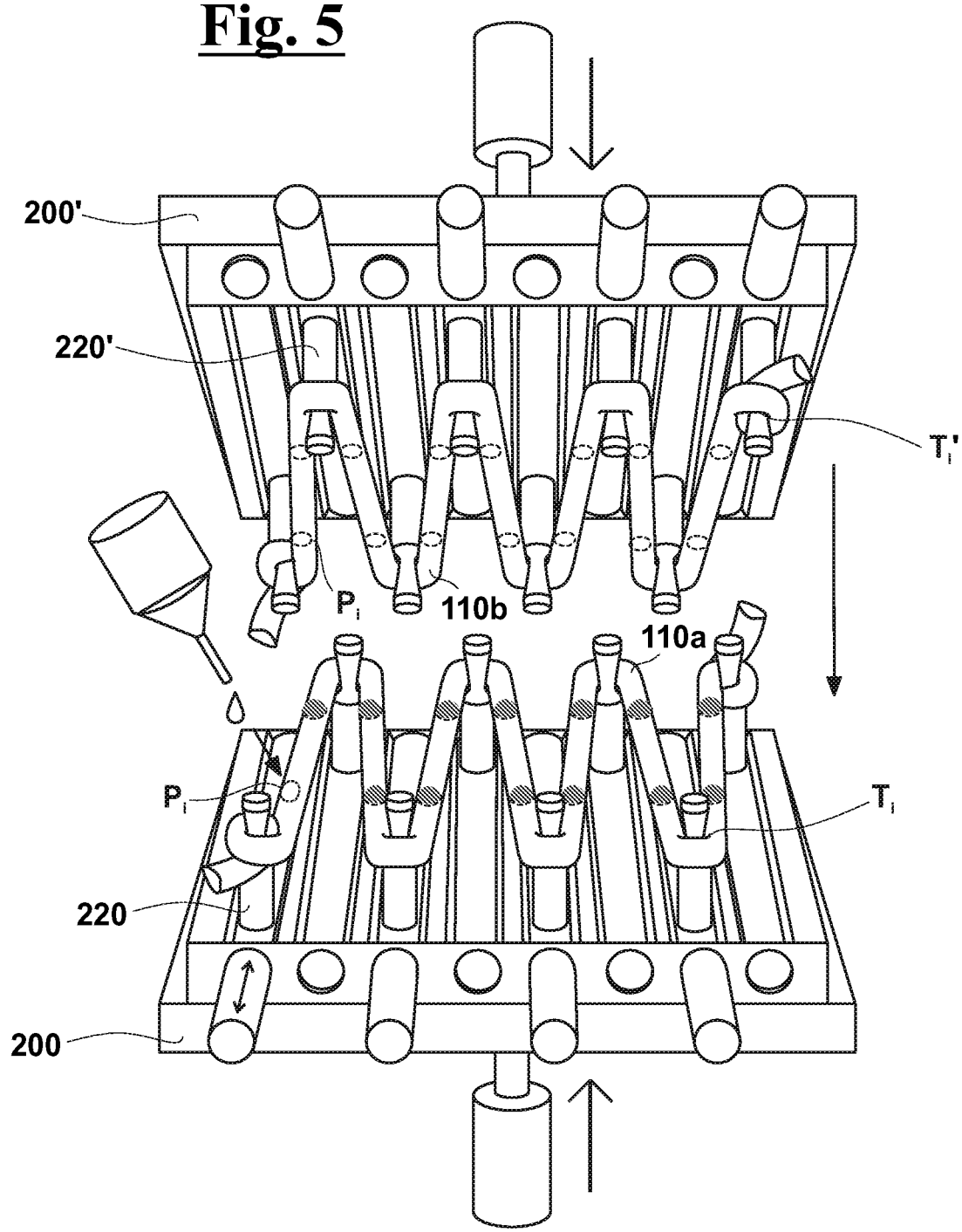
FIG. 5 graphically shows an exemplary embodiment, variant of that of FIG. 4, wherein mobile tensioning elements are provided.

In FIG. 5 a variant of the method is shown wherein the tensioning elements 220,220' can translate with respect to the supports 200 and 200' to suitably adjust the tension of the threads 110a,110b and to facilitate the arrangement of the textile thread along the trajectory, in addition to allow greater adaptation to the desired geometry for the textile product.

In a first solution of the invention, as shown for example in an exemplary embodiment of FIG. 4, a first and a second portion of a single textile thread 110 are arranged on both the trajectories $\gamma_1$ and $\gamma_2$, so that the textile thread 110 is glued on itself to generate the non-woven fabric.

Alternatively, as shown for example in the embodiment of FIG. 5, a first textile thread 110a can be arranged on the trajectory $\gamma_1$, whereas at least one second textile thread 110b is arranged on at least one trajectory $\gamma_2$, passing on the intersection point $P_i$. In this solution, therefore, the textile thread 110 is cut after being placed along the trajectory $\gamma_1$.

In each embodiment of the present invention, can be a step of cutting the textile thread 110,110a,110b to separate it by the thread guide 100. Such step can be carried out both before and after the joining step, or only after this step.

In general, the tensioning points $T_i$ and $T_i'$ can be made, alternatively, or in combination:
using glue or other removable adhesives on the rigid support;
by means of tensioning elements integral with the rigid support;
by means of tensioning elements movable with respect to the rigid support, so as to vary the working perimeter on the rigid supports and/or increase the tension of the thread;
by means of a rigid support equipped with micro-holes that keep the thread in position by suction;
by means of a rigid support equipped with an electrostatic charge which holds the thread in position by electrostatic force;
by means of a rigid magnetically charged support and a magnetized thread.

Figure 7:
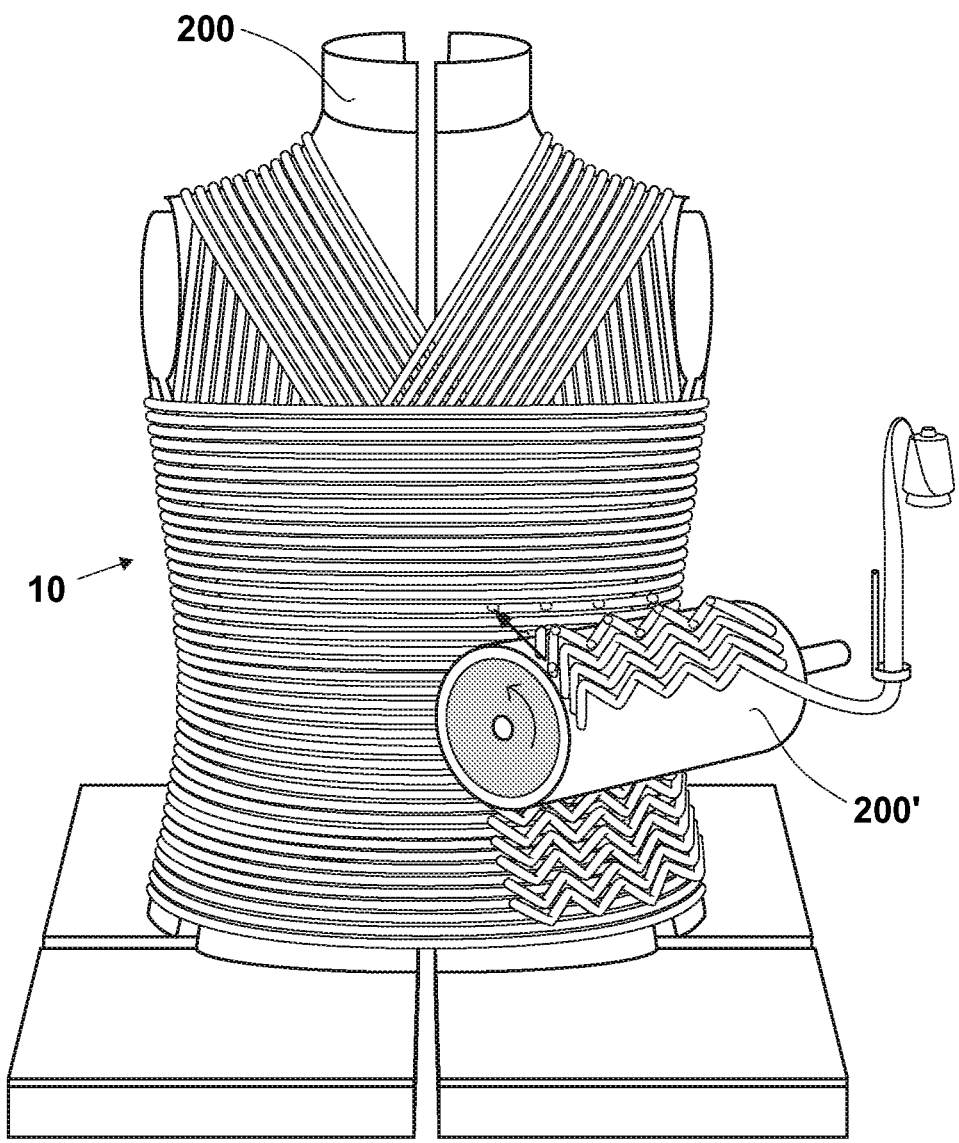
FIG. 7 graphically shows the subsequent steps of an embodiment of the method wherein a three-dimensional rigid anthropomorphic support and a rotating rigid support are provided.

In particular, the rigid support can be equipped with parts made with elastic or rubbery materials, such as shown in FIG. 7, to facilitate the meeting of the threads in the overlapping and joining steps.

Figure 6:
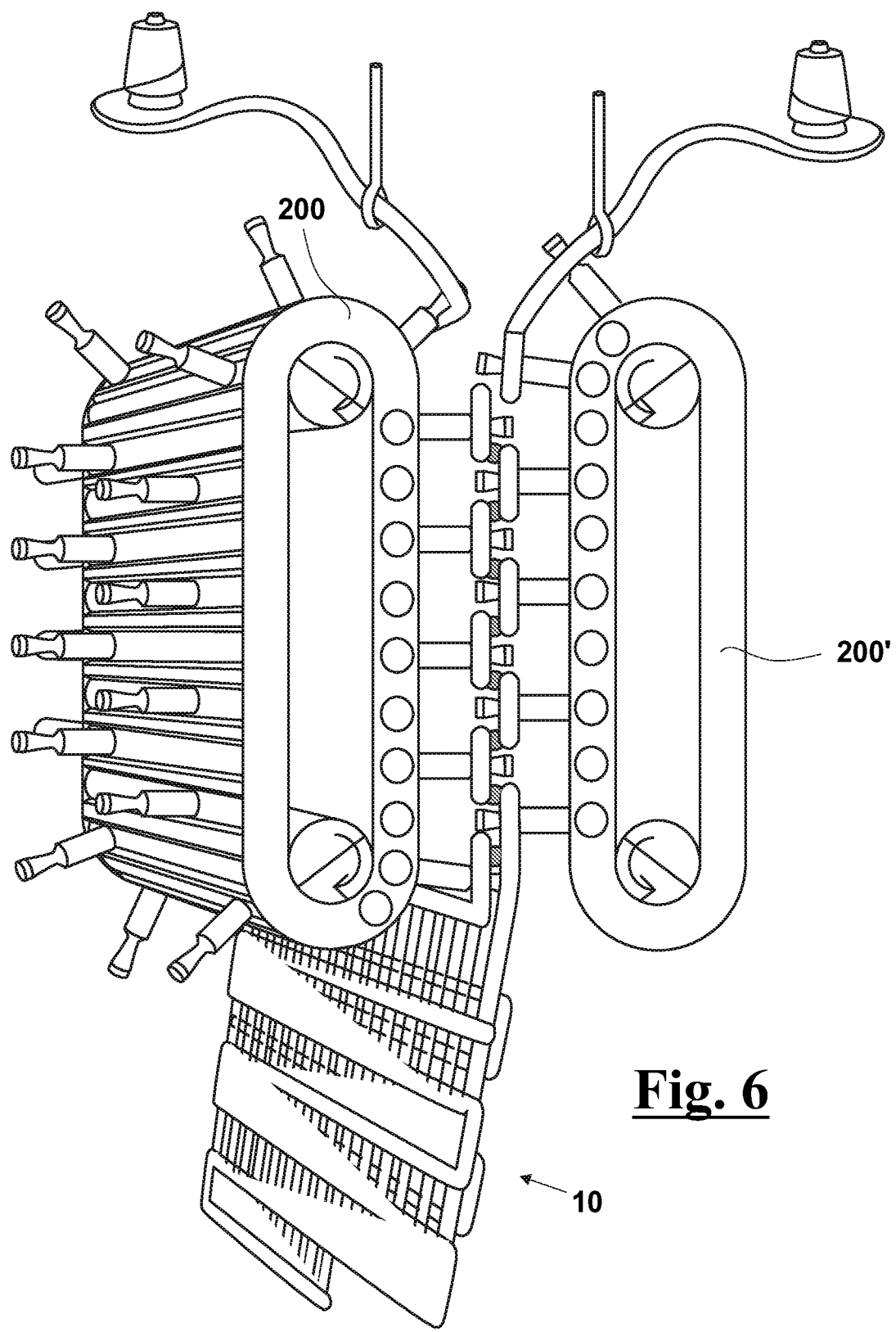
FIG. 6 graphically shows an exemplary embodiment in which two rotating rigid supports are provided for continuous processing.

In the variant embodiment of FIG. 6, two rotating rigid supports 200 and 200' are provided comprising tensioning elements 220,220' translatable with respect to each other, configured to create tensioning points $T_i$ and arranged along the trajectories $\gamma_1$ and $\gamma_2$. In this embodiment, the joining by gluing is carried out by overlapping the supports and can be carried out during the continuous arrangement of the textile threads 110 along the trajectories $\gamma_1$ and $\gamma_2$.

With reference to FIG. 7, the first rigid support 200 can also be an anthropomorphic three-dimensional support that allows the non-woven fabric to be modelled in a three-dimensional way, obtaining the joining of the textile threads by means, for example, of a second rotating rigid support 200'.

Figure 8:
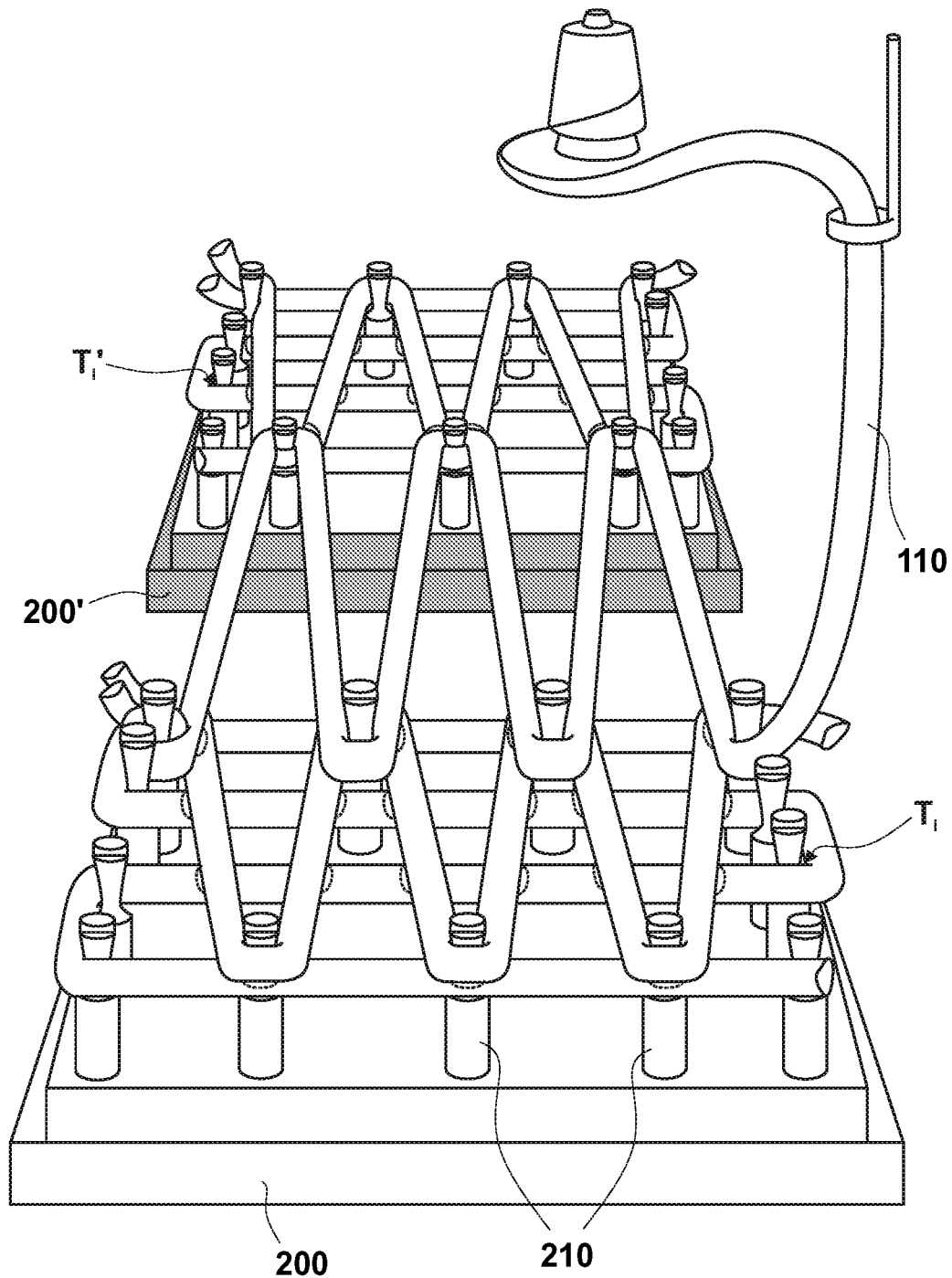
FIG. 8 shows a variant of the method, according to the present invention, wherein the two rigid supports are not superimposed to carry out the step of joining the textile threads, but are placed adjacent to one another in order to allow the joining of non-woven fabrics created in parallel.

In FIG. 8 an embodiment of the method is shown, according to the present invention, wherein the two rigid supports 200 and 200' are not superimposed to carry out the step of joining the textile threads 110, but are used in parallel to provide different portions of non-woven fabric 10a and 10b and join them subsequently.

In this embodiment, therefore, the joining the textile threads 110 is made separately on each rigid support 200, 200', for example by gluing.

Figure 9:
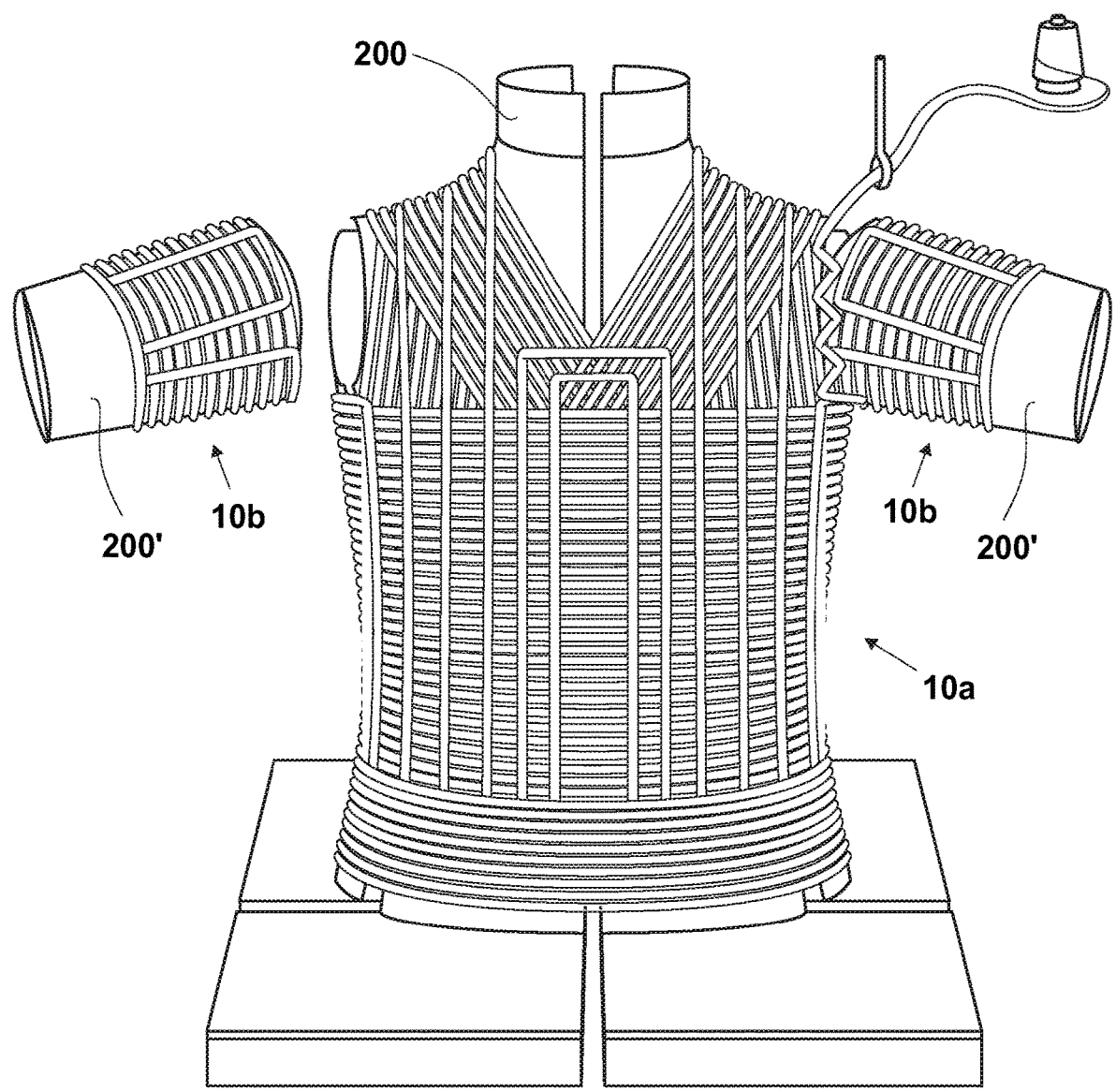
FIG. 9 shows the step of joining several parts obtained by means of three three-dimensional rigid supports.

In particular, with reference to FIG. 9, the rigid supports 200 and 200' can be anatomically shaped three-dimensional supports that allow the various parts of an item of clothing to be created.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. it is to be understood that the phraseology or terminology that is employed herein is for the purpose of description and not of limitation.

The invention claimed is:

1. A method to generate a non-woven fabric comprising the steps of:
    prearranging at least one thread guide arranged to guide at least one textile thread;
    prearranging an actuator that is arranged to actuate said or each thread guide according to at least one degree of freedom;
    prearranging a first rigid support and a second rigid support;
    handling said or each thread guide by said actuator for arranging at least one first portion of said or each textile thread (110,110a,110b) along at least one first trajectory $\gamma_1$ on said first rigid support;
    handling said or each thread guide by said actuator for arranging at least one second portion of said or each textile thread along at least one second trajectory $\gamma_2$ on said first or second rigid support, said or each second trajectory $\gamma_2$ arranged to overlap with said or each first trajectory $\gamma_1$ at one or more intersection points $P_i$;
    joining said or each second portion of said or each textile thread with said or each first portion of said or each textile thread at said or each intersection point $P_i$; and
    overlapping said second rigid support on said first rigid support to provide said step of joining said or each second portion of said or each textile thread with said or each first portion of said or each textile thread at said or each intersection point $P_i$,
    wherein:
    tensioning elements are arranged on said first rigid support in order to create tensioning points $T_i$;
    said or each first trajectory $\gamma_1$ is adapted to pass through said tensioning points $T_i$ to provide to said or each textile thread a predetermined tension between two consecutive tensioning points $T_i$ along said or each first trajectory $\gamma_1$;
    tensioning elements are arranged on said second rigid support in order to create auxiliary tensioning points $T_i'$; and
    said or each second trajectory $\gamma_2$ is adapted to pass through said auxiliary tensioning points $T_i'$ to provide to said or each textile thread a predetermined tension between two consecutive auxiliary tensioning points $T_i'$ along said or each second trajectory $\gamma_2$.

2. The method to generate a non-woven fabric, according to claim 1, wherein said step of joining said or each second portion of said or each textile thread with said or each first portion of said or each textile thread at said or each intersection point $P_i$ is made by gluing.

3. The method to generate a non-woven fabric, according to claim 1, wherein also said or each second trajectory $\gamma_2$ is adapted to pass through said tensioning points $T_i$ to provide to said or each textile thread a predetermined tension between two consecutive tensioning points $T_i$ along said or each second trajectory $\gamma_2$.

4. The method to generate a non-woven fabric, according to claim 1, wherein said first rigid support is a curved rotating surface.

5. The method to generate a non-woven fabric, according to claim 4, wherein said second rigid support is a curved rotating surface.

6. The method to generate a non-woven fabric, according to claim 5, wherein said first rigid support and said second rigid support are adapted to rotate to provide a step of overlapping said second rigid support on said first rigid support.

7. The method to generate a non-woven fabric, according to claim 5, wherein said first rigid support and said second rigid support are adapted to rotate during said steps of handling said or each thread guide for arranging said or each textile thread along said or each first trajectory $\gamma_1$ and along said or each second trajectory $\gamma_2$.

8. The method to generate a non-woven fabric, according to claim 1, wherein said first rigid support and said second rigid support are adapted to rotate to provide said step of overlapping said second rigid support on said first rigid support.

9. The method to generate a non-woven fabric, according to claim 1, wherein said first rigid support and said second rigid support are adapted to rotate during said steps of handling said or each thread guide for arranging said or each textile thread along said or each first trajectory $\gamma_1$ and along said or each second trajectory $\gamma_2$.

10. The method to generate a non-woven fabric, according to claim 1, wherein said second rigid support is a curved rotating surface.

11. The method to generate a non-woven fabric, according to claim 10, wherein said first rigid support and said second rigid support are adapted to rotate to provide a step of overlapping said second rigid support on said first rigid support.

12. The method to generate a non-woven fabric, according to claim 10, wherein said first rigid support and said second rigid support are adapted to rotate during said steps of handling said or each thread guide for arranging said or each textile thread along said or each first trajectory $\gamma_1$ and along said or each second trajectory $\gamma_2$.

* * * * *